US007848847B2

(12) United States Patent
Mougin

(10) Patent No.: US 7,848,847 B2
(45) Date of Patent: Dec. 7, 2010

(54) METHOD FOR DIAGNOSING MALFUNCTION OF APPARATUS DELIVERING GOODS AND SERVICES AGAINST PAYMENT

(75) Inventor: Thierry Mougin, Saint Vit (FR)

(73) Assignee: Parkeon S.A.S., Paris (FR)

( * ) Notice: Subject to any disclaimer, the term of this patent is extended or adjusted under 35 U.S.C. 154(b) by 271 days.

(21) Appl. No.: 10/518,327

(22) PCT Filed: Jun. 25, 2003

(86) PCT No.: PCT/FR03/01951

§ 371 (c)(1),
(2), (4) Date: Jan. 21, 2005

(87) PCT Pub. No.: WO2004/003862

PCT Pub. Date: Jan. 8, 2004

(65) Prior Publication Data

US 2005/0251288 A1 Nov. 10, 2005

(30) Foreign Application Priority Data

Jun. 27, 2002 (FR) .................................. 02 08044

(51) Int. Cl.
*G06F 17/00* (2006.01)

(52) U.S. Cl. .......................... 700/244; 368/90; 235/378

(58) Field of Classification Search ......... 700/231-244; 368/90; 235/378
See application file for complete search history.

(56) References Cited

U.S. PATENT DOCUMENTS

| | | | | |
|---|---|---|---|---|
| 4,412,292 | A | 10/1983 | Sedam et al. | 364/479 |
| 5,822,221 | A * | 10/1998 | Groenteman | 702/188 |
| 5,844,808 | A * | 12/1998 | Konsmo et al. | 700/244 |
| 5,980,089 | A * | 11/1999 | Weis | 700/213 |
| 6,111,522 | A * | 8/2000 | Hiltz et al. | 340/932.2 |
| 6,298,449 | B1 * | 10/2001 | Carter | 713/340 |
| 6,522,946 | B1 * | 2/2003 | Weis | 700/232 |
| 2007/0083287 | A1 * | 4/2007 | Defosse et al. | 700/236 |

FOREIGN PATENT DOCUMENTS

| | | | |
|---|---|---|---|
| EP | 0817138 | 1/1998 | 9/0 |
| FR | 2830963 | 4/2003 | 3/8 |
| WO | WO9527242 | 10/1995 | |
| WO | WO0068912 | 11/2000 | 23/0 |

* cited by examiner

*Primary Examiner*—Gene Crawford
*Assistant Examiner*—Michael K Collins
(74) *Attorney, Agent, or Firm*—Young & Thompson

(57) ABSTRACT

A method for diagnosing malfunctions of apparatus delivering goods or services against payment of an automatic terminal type, is provided. The method includes calculating the value of at least one data item representative of the operation of the apparatus, comparing the calculated value to a predetermined reference value and deducing the occurrence of a malfunction in the event of a predetermined difference between the values.

12 Claims, 3 Drawing Sheets

METHOD FOR DIAGNOSING MALFUNCTION OF APPARATUS DELIVERING GOODS AND SERVICES AGAINST PAYMENT

RELATED APPLICATION

This application is a National Stage Application of PCT Patent Application No. PCT/FR2003/001951, which in turn claims the benefit of priority from French Patent Application No. 02/08044, filed on Jun. 27, 2002, the entirety of which are incorporated herein by reference.

FIELD OF THE INVENTION

The present invention relates to a method for diagnosing malfunction of apparatus delivering goods and services against payment. The present invention also relates to apparatus adapted to implement this method and where applicable a remote management server adapted accordingly.

The present invention relates in particular to payment terminals used to pay charges for parking motor vehicles.

BACKGROUND OF THE INVENTION

For many years a charge has had to be paid to park in towns. To be able to leave his car in a parking space, a motorist must prepay an amount corresponding to the selected parking time. In the absence of such payment, the vehicle is illegally parked and the driver is liable to be issued a voucher or a fine by surveillance operatives.

To occupy a parking space that has to be paid for, the user must therefore pay for the right to park at an appropriate payment terminal. Such terminals are more widely known as parking meters or parking voucher dispensers.

The parking meter system consists in a terminal at which a motorist wishing to park must pay an amount corresponding to the required parking time by means of coins, a card, etc. An indicator showing the parking time paid for is then displayed on the terminal. This indicator is progressively repositioned as time passes. This kind of system is simple to monitor because surveillance operatives have only to look at the position of the indicator to determine whether the vehicle occupying the space controlled by the terminal in question is legally parked.

In the case of parking voucher dispensers, the user receives a voucher carrying printed information, and in particular the authorized parking time limit, in exchange for payment for the required parking time, by means of coins, an appropriate payment card, etc. The user must place this voucher so that it is clearly visible through the windshield of his vehicle. The surveillance operatives then check that a voucher is present in a parked car and check the indicated parking time limit.

Whatever type of payment terminal is used (parking meter or parking voucher dispenser), it is important to be able to identify as soon as possible any malfunction of a terminal that may disrupt payment by motorists. A prompt diagnosis means that a maintenance operative may be sent out quickly and limits loss of revenue.

The manufacturers of such terminals have therefore developed many tools for diagnosing the operation of terminals and systems for sending any necessary alarms to a remote management center and/or alerting maintenance operatives directly. Checks carried out include checks on the remaining stock of vouchers, filling of the cash box, jamming of coins in the coin sorter, etc.

However, this approach tends to increase the cost of the terminals by increasing the number of sensors and associated electronic circuits and is still incapable of diagnosing certain malfunctions that are undetectable, such as fraud and vandals blocking the payment orifices, and thereby rendering the apparatus inoperative.

It is difficult to place sensors in all the sensitive areas of an apparatus to detect metallic and non-metallic foreign bodies, solids, liquids, etc.

OBJECTS AND SUMMARY OF THE INVENTION

The present invention therefore proposes to remedy these drawbacks by proposing a simple method that does not necessitate any additional equipment and is able to diagnose malfunction of a payment terminal.

The method according to the invention for diagnosing malfunctions of apparatus delivering goods or services against payment, of the automatic terminal type, is characterized in that it consists in calculating the value of at least one data item representative of the operation of said apparatus, comparing said calculated value to a predetermined reference value, and deducing the occurrence of a malfunction in the event of a predetermined difference between said values.

According to another feature of the method of the invention said data item representative of the operation of said apparatus is representative of the frequency of payments made at said apparatus.

According to another feature of the method of the invention said data item representative of the operation of said apparatus is the time that has elapsed since the last payment made to said apparatus.

According to another feature of the method of the invention said data item representative of the operation of said apparatus is the time that has elapsed since the last payment made via said apparatus for each of the payment means accepted by said apparatus.

According to another feature of the method of the invention said reference value is representative of the average of values taken by said data item representative of the operation of the apparatus.

According to another feature of the method of the invention said reference value depends at least on a parameter such as the time of day or the apparatus concerned.

According to another feature of the method of the invention said predetermined difference depends at least on a parameter such as the time of day or the apparatus concerned.

According to another feature of the method of the invention the operations of calculating a data item representative of the operation of said apparatus and comparing the calculated value and a predetermined reference value are effected directly by said apparatus.

According to another feature of the method of the invention the operations of calculating a data item representative of the operation of said apparatus and comparing the calculated value and a predetermined reference value are partly or completely effected by a server adapted to communicate with said apparatus.

According to another feature of the method of the invention said apparatus is a terminal for paying for parking spaces, such as a parking voucher dispenser or a parking meter.

BRIEF DESCRIPTION OF THE DRAWINGS

The objects, aspects and advantages of the present invention will be better understood from the following description of one embodiment of the invention, which is given by way of nonlimiting example and refers to the appended drawings, in which:

FIG. 1 shows an automatic terminal for paying for goods or services, but represents only the components necessary to understanding the invention. In this instance the terminal is a parking voucher dispenser 1 that is part of an installed base 10 of parking voucher dispensers that is managed by an operator such as a private company or a local authority. The installed base of parking voucher dispensers may comprise from several dozen to several thousand dispensers, depending on the size of the town or urban area concerned.

DETAILED DESCRIPTION

Figure 1:
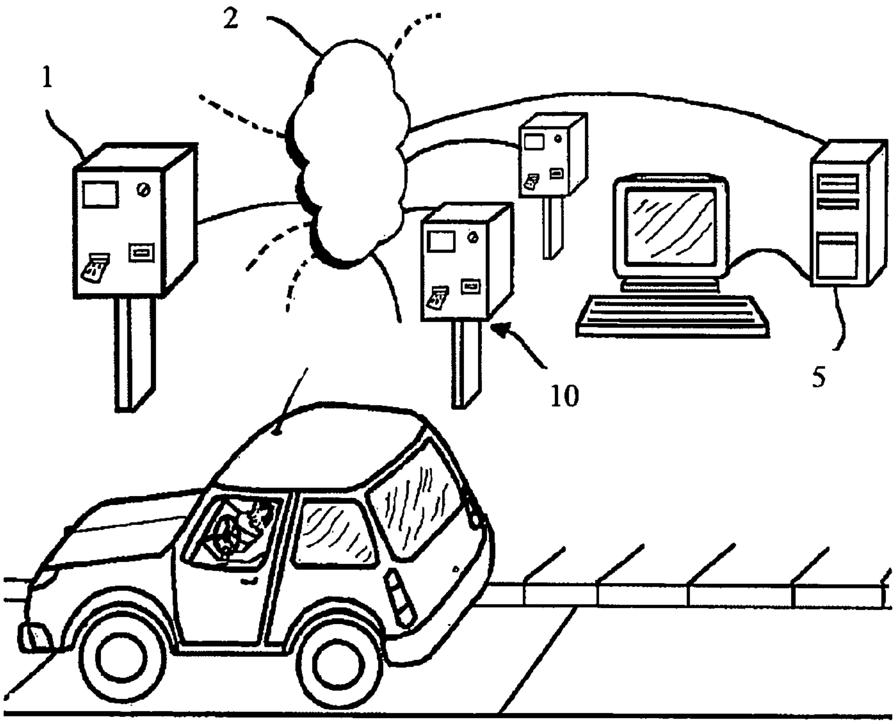
FIG. 1 is a diagrammatic view of an installed base of parking voucher dispensers and a management server implementing the method of the invention.

Of course, the use of parking voucher dispenser type payment terminals is in no way limiting on the present invention. The invention also applies to parking meters and more generally to any automatic terminal for paying for goods or services, such as a public telephone or a drinks dispenser.

The parking voucher dispensers are regularly distributed along the pavements of streets in which parking is controlled and has to be paid for, for example every 50 meters.

Like the other parking voucher dispensers of the installed base 10, the parking voucher dispenser 1 conventionally comprises a certain number of particular components that are inherent to a parking voucher dispenser. These include data display and input means, such as a screen and a keypad, and payment means comprising a card reader and/or a coin sorter, etc. Note that the parking voucher dispenser may also be equipped with means enabling payment for the right to park by means of a mobile telephone. All of these hardware components are controlled by a microprocessor with appropriate software for supervising the operation of each component.

The equipment of the parking voucher dispenser 1 further includes communication means providing access to a remote server 5. To facilitate management and maintenance of the payment terminals by the operator (local authority, etc.), the terminals are provided with communication means adapted to communicate with a remote central computer 5 and to transfer data to it.

This central computer 5 for supervising the operation of the installed base of parking terminals, also known as a parking management system (PMS), receives periodically from each of the terminals activity reports containing data descriptive of the operation of the apparatus or alarms if events necessitating the intervention of a maintenance operative occur (cashbox full of coins, no paper for printing vouchers, malfunction or vandalism).

Moreover, the PMS server 5 may download into the terminals files of parameters, tables of charges or updates to the programs executed by the microprocessors of the payment terminals, such updates improving the programs already installed or introducing new user services.

The telephone network 2 used by the parking voucher dispenser 1 to access the management server 5 is an analog public switched telephone network (PSTN) or an integrated services digital network (ISDN). The network 2 may equally consist of a mobile telephone network of any kind (GSM, CDMA, TDMA, AMPS, D-AMPS), or the Internet, or more generally any communication network adapted to transmit data (X.25, Ethernet, etc.), and any combination of such networks.

The PMS 5 supervises the installed base 10 of parking voucher dispensers. Its function is to exchange with these parking voucher dispensers information concerning their operation and in particular transactions effected by users (as described in more detail below).

The parking voucher dispensers and the PMS 5 are therefore provided with appropriate supervision and information send/receive means, which are known in the art and are not described in more detail here.

Among its other functions, the PMS 5 transfers to the parking voucher dispensers files necessary for them to operate, such as tables of charges, configuration parameters, lists for surveillance of the means of payment used (white, black or grey lists), or programs controlling the operation of the microprocessors of the parking voucher dispensers.

For their part, the parking voucher dispensers transmit information relating to their use, namely a daily log containing data relating to transactions effected and to traffic, an alarm log that is used to report to the PMS 5, to enable the intervention of a surveillance operative, the occurrence of incidents or attacks on their integrity, such as a malfunction of the card reader, etc.

In one particular embodiment of the invention, the parking voucher dispenser 1 cooperates with software implemented entirely in the microprocessor of the parking voucher dispenser 1 and adapted to detect the occurrence of malfunctions and thus able to arrive at an autodiagnosis.

This embodiment is not limiting on the invention. Thus, in a different embodiment, the software is divided between the microprocessor of the parking voucher dispenser and the remote server 5. In a further embodiment, the software is executed entirely in the remote server, which in particular enables account to be taken of information from other parking voucher dispensers.

The method on which the invention is based relies on the statistical analysis of at least one item of data characteristic of the operation of the apparatus, and in particular the frequency of payments.

To be more precise, the object of the present invention is to detect abnormal operation by comparing the real behavior of the parking voucher dispenser 1 with a predetermined nominal behavior.

The processing of certain information linked to payment, such as the time that has elapsed since the previous payment (but equally the number of valid vouchers, the rate of occupancy, etc.), enables malfunctions to be diagnosed.

Assume that the payment terminal 1 is out of service, for example because its screen has been sprayed with paint, because the payment slots for inserting coins or cards have been blocked up, or because the terminal has been uprooted. At present such malfunctions are difficult for dedicated monitoring means to diagnose unless costly dedicated sensors are used.

Because the parking voucher dispenser is out of service, users turn away from the terminal and payments therefore cease. The number of valid vouchers (or the rate of occupation) therefore falls off (if the malfunction occurs during the daytime) or does not resume (if the malfunction occurs before the beginning of the period in which parking has to be paid for). Observing the (non)payments enables a problem to be identified and one or more alarms to be generated. The operator of the car park can then dispatch a maintenance operative to identify and correct the problem.

Note that consolidating the payments (number of valid vouchers or rate of occupation) made at all the payment terminals in the same street or the same sector may further refine the diagnosis, as the unavailability of a terminal logically leads to a transfer of at least some activity to other terminals nearby, if there are any. The adjoining terminals will therefore have a rate of occupation that rises above the norm. Thus the concomitant occurrence of a fall off in the payments at a given terminal and a rise in the payments at a nearby terminal or nearby terminals indicates a malfunction of the terminal concerned. On the other hand, if the fall off in the rate of occupation affects not one terminal but all the terminals in the same street, it is possible to envisage hypotheses other than a malfunction of the terminals, and in particular the closing of the street to traffic because of roadworks, etc. It is then feasible to check with the highways department, for example, before dispatching a maintenance operative.

According to the invention, the microprocessor of the parking voucher dispenser 1 is therefore provided with a program for monitoring transactions performed by users during the daytime.

This transaction monitoring program is more particularly for calculating at least one parameter significant of the execution of transactions. This parameter is the time T that has elapsed since issuing the last voucher, for example. In one embodiment of the invention, this parameter is calculated for each payment means, because one may have been vandalized but not another.

If the parking voucher dispensers incorporate a card reader and a coin sorter, two parameters are calculated, namely a time Tm for coin payments and a time Tc for card payments. A distinction may also be made between magnetic card payments and smart card payments or between payments by Visa/Masterard type credit cards and Moneo type electronic wallets, in that each type of payment utilizes specific means that could malfunction.

For simplicity, the remainder of the description refers only to a time T corresponding to a given payment means.

The microprocessor calculates the time T periodically as the difference between the present time and the time of the most recent transaction for the payment means concerned.

The time T is then compared to a stored threshold value Tmax, and if the latter is exceeded an alarm is tripped.

Figure 2:
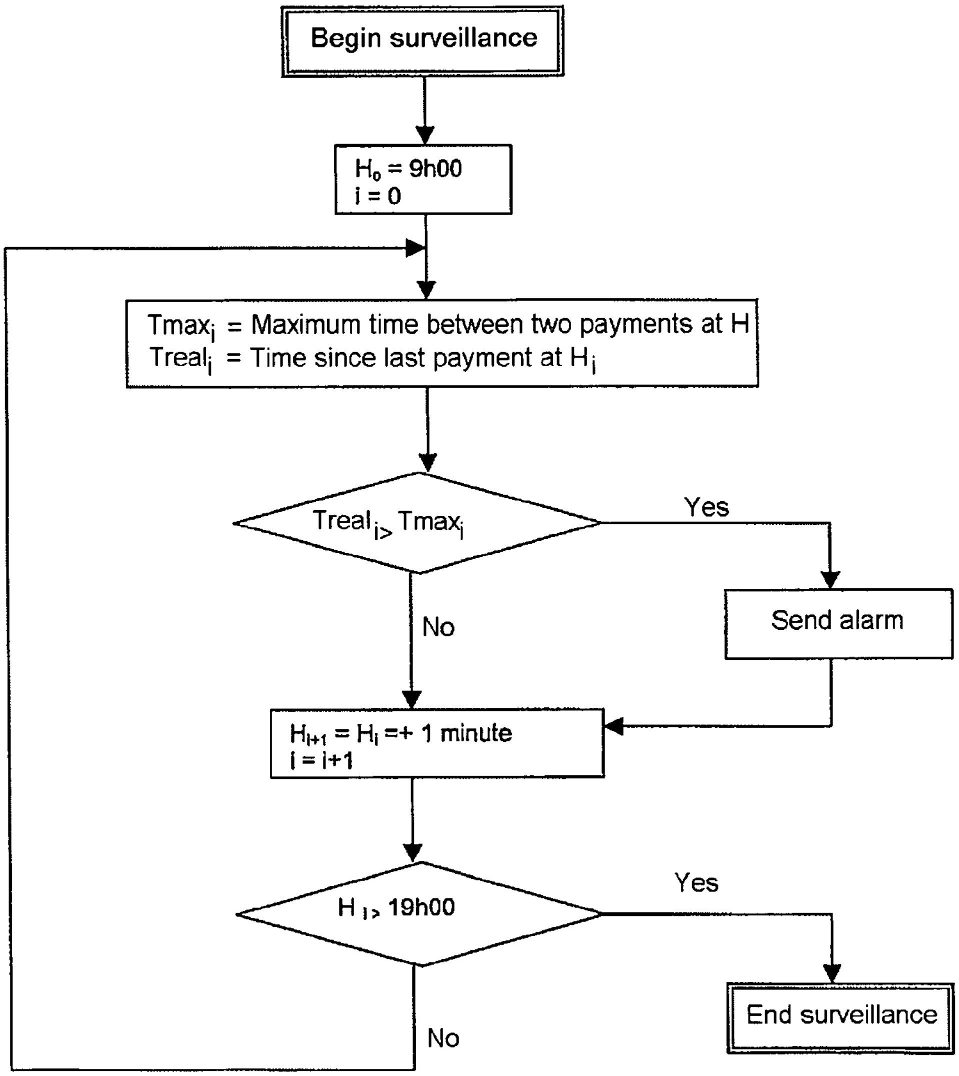
FIG. 2 shows the main steps of the method of the invention.

Referring to FIG. 2, the program executed by the microcontroller of the terminal 1 therefore calculates the number $Treal_i$ of vouchers that are valid at a given time t-i regularly throughout the period in which parking has to be paid for, for example from 9h to 19h.

The number $Treal_i$ is calculated from stored information relating to each of the individual transactions effected by the terminal 1 for the payment means concerned. The time Tp-n at which each payment n occurs is stored in an appropriate memory area (not shown).

The number $Treal_i$ is then calculated as the difference between the value of the present time t-i supplied by the internal clock of the microprocessor on the iteration i and the time Tp-n, where n denotes the latest payment. The number $Treal_i$ is therefore a measure of the time that has elapsed between the latest payment for the payment means concerned and the present time. How frequently $Treal_i$ is calculated depends on the capabilities of the microprocessor. The calculation of $Treal_i$ might therefore be triggered every minute, for example. The value of Tp-n is updated on each payment.

The program then compares the number $Treal_i$ to a predetermined threshold value $Tmax_i$.

If $Treal_i$ is less than $Tmax_i$, then no malfunction is diagnosed, but if $Treal_i$ is greater than $Tmax_i$, then a malfunction is considered to have occurred and an alarm is tripped in the form of an appropriate signal sent to the server 5, which then dispatches a maintenance operative to the terminal 1.

In a different embodiment, the terminal 1 could send an alarm message directly to a maintenance operative equipped with appropriate communication means and able to reach the site quickly.

With regard to the initial time, i=0, tp−0 may be defined as having the value 9h00 if 9h00 is the start time D0 of the period in which parking has to be paid for.

In one particular embodiment of the invention, $Tmax_i$ is obtained by trial and error and mapped in a memory of the microprocessor of the terminal 1. The data is stored after downloading it from the server 5 or during on-site maintenance.

Figure 3:
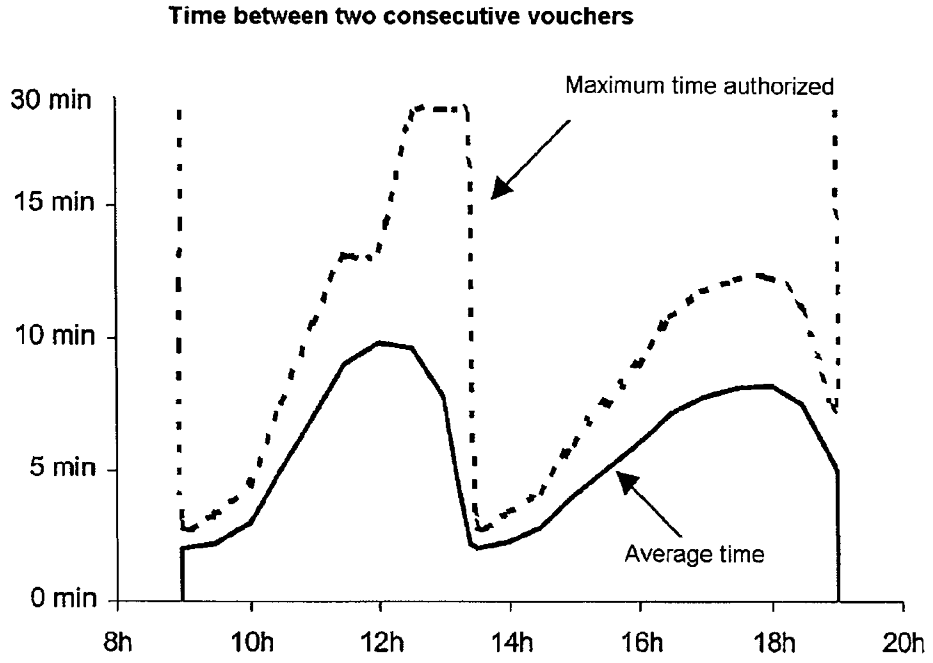
FIG. 3 shows the evolution during the course of the day of the average time delay between the issuing of two consecutive parking vouchers by a given parking voucher dispenser.

In another particular embodiment of the invention, the value $Tmax_i$ is deducted from the value $Tnom_i$ that is the average value observed at the time t-i between two consecutive payments for the payment means concerned and for the parking voucher dispenser concerned. $Tmax_i$ is equal to $Tnom_i$ multiplied by an appropriate coefficient $Coeff_i$ that may depend on the type of distribution (Poisson's law, normal distribution) observed when measuring the values $Tnom_i$ ($X^2$ test), for example. Thus a constant coefficient $Coeff_i$ might be used and adjusted to take account of 95% of observed values and prevent the multiplication of false alarms compared to a threshold that is set too low. The coefficient $Coeff_i$ may also evolve during the daytime on the basis of trial and error analyses. FIG. 3 shows curves of the evolution of Tnom and Tmax in the daytime by way of nonlimiting example.

The Tnom and Tmax curves may be determined with greater or lesser accuracy by considering a greater or lesser number of factors. Thus the curves may be identical for all parking voucher dispensers or specific to and adapted to each parking voucher dispenser. There may be differences in the patterns of use of the parking voucher dispensers because of their location, parking patterns being different in residential and business areas or commercial areas.

Similarly, the curves may be considered as constant regardless of the day of the week or adapted to each day of the week or each day of the year, to take account of seasonal variations and in particular holiday periods.

Similarly, Tnom could be taken as constant regardless of the time of day or depend on the time of day in the manner shown in FIG. 3. The Tnom curve shown in FIG. 3 is a curve with two peaks; the time elapsed between two successive voucher sales for a given payment means increases during the morning to a maximum value and then falls off in the early afternoon, then increases during the afternoon and falls off again toward the end of the period during which parking must be paid for. This curve emphasizes rush hours occurring at the beginning of the day, in the middle of the day, and at the end of the day (vouchers dispensed at the end of the day are valid after 9h the next day for the remaining amount of the sum paid the day before).

The Tnom, Tmax curves are obtained by direct statistical analysis of observed raw data in the voucher dispenser 1 or the whole or a portion of the installed base of parking voucher dispensers. The curves may be generated by the parking voucher dispenser directly or by the PMS server 5.

In one particular embodiment of the invention, the method is not implemented by the parking voucher dispenser 1 alone but by the server 5, using appropriate information supplied by the parking voucher dispenser 1.

The electronic circuit of the parking terminal, in this instance the parking voucher dispenser 1, therefore cooperates with software dedicated to remote collection of information for use by the PMS management server 5.

The program executed by the microcontroller sends the server 5 periodically the total for payments effected via each of the payment means of the terminal, for example. The server 5 then deduces from this information the time that has elapsed since the last payment via each of the payment means; if that time becomes abnormal it trips an alarm to schedule a maintenance operation, where applicable after examining the behavior of adjoining parking voucher dispensers.

The manager's decision whether to attend to the terminal that sent the surveillance alarm or not may also depend on consolidation of data supplied by other parking voucher dispensers in the same area.

Of course, the embodiments shown are not limiting on the present invention.

Thus the invention is not limited to terminals connected to a remote management server, but relates equally to terminals merely adapted to send an alarm signal to a maintenance center.

Obviously, the present invention is not limited to detecting abnormal operation of a payment terminal simply by analyzing the time T that has elapsed since issuing the last voucher. The present invention encompasses the detection of abnormal operation by analyzing one or more items of data characteristic of the operation of the payment terminal.

The invention claimed is:

1. A method for diagnosing malfunctions occurring on an automatic terminal apparatus for delivering goods or services against payment, received at one of at least two different means for payment, said method for diagnosing malfunctions comprising the steps of:

for each means for payment, calculating a value of at least one respective data item representative of an operation of said apparatus, wherein said at least one respective data item representative of the operation of said apparatus is an amount of time that has elapsed since a latest payment made with the means for payment and a time that is intended to elapse as long as no other payment is made with the means for payment;

comparing each calculated value to a respective predetermined reference value; and deducing an occurrence of a malfunction in an event that one of the calculated values is superior to its predetermined reference value.

2. The method according to claim 1, wherein said data item representative of the operation of said apparatus is representative of a frequency of payments made at said apparatus.

3. The method according to claim 1, wherein said reference value is representative of an average of values taken by said data item representative of the operation of the apparatus.

4. The method according to claim 1, wherein said reference value depends at least on a parameter such as a time of day or the apparatus concerned.

5. The method according to claim 1, wherein a predetermined difference depends at least on a parameter such as a time of day or the apparatus concerned.

6. The method according to claim 1, wherein the operations of calculating the data item representative of the operation of said apparatus and comparing the calculated value and the predetermined reference value are affected directly by said apparatus.

7. The method according to claim 1, wherein the operations of calculating the data item representative of the operation of said apparatus and comparing the calculated value and the predetermined reference value are partly or completely effected by a server adapted to communicate with said apparatus.

8. The method according to claim 1, wherein said apparatus is a terminal for paying for parking spaces, a parking voucher dispenser or a parking meter.

9. An automatic apparatus for delivering goods or services against payment, said apparatus comprising:

one of at least two means for payment;

a means for calculating a value of at least one data item representative of an operation of said apparatus for each means for payment, where said at least one respective data item representative of the operation of said apparatus is an amount of time that has elapsed since a latest payment made with the means for payment, and will elapse as long as no other payment is made with the means for payment;

means for comparing each calculated value to a respective reference value; and means for detecting an occurrence of a malfunction in an event that one of the calculated values is superior to its reference value.

10. The apparatus as claimed in claim 9, wherein said apparatus is a terminal for paying for parking spaces.

11. The apparatus as claimed in claim 10, wherein said apparatus is either one of a parking voucher dispenser or a parking meter.

12. The method according to claim 1, wherein each reference value is obtained by direct statistical analysis of observed raw data of several automatic terminal type apparatuses including said terminal type apparatus.

* * * * *